A. E. JACOBS.
CASH REGISTER.
APPLICATION FILED JUNE 30, 1914.
1,190,416.
Patented July 11, 1916.
4 SHEETS—SHEET 1.
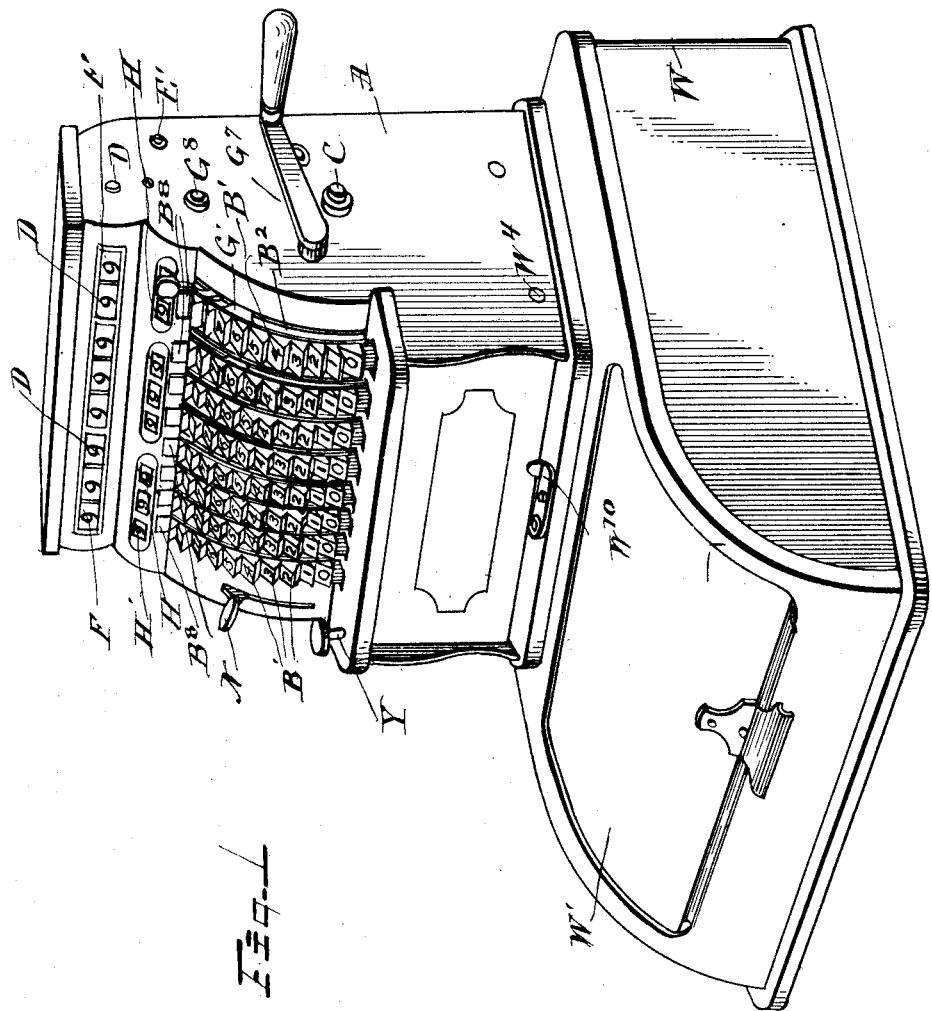

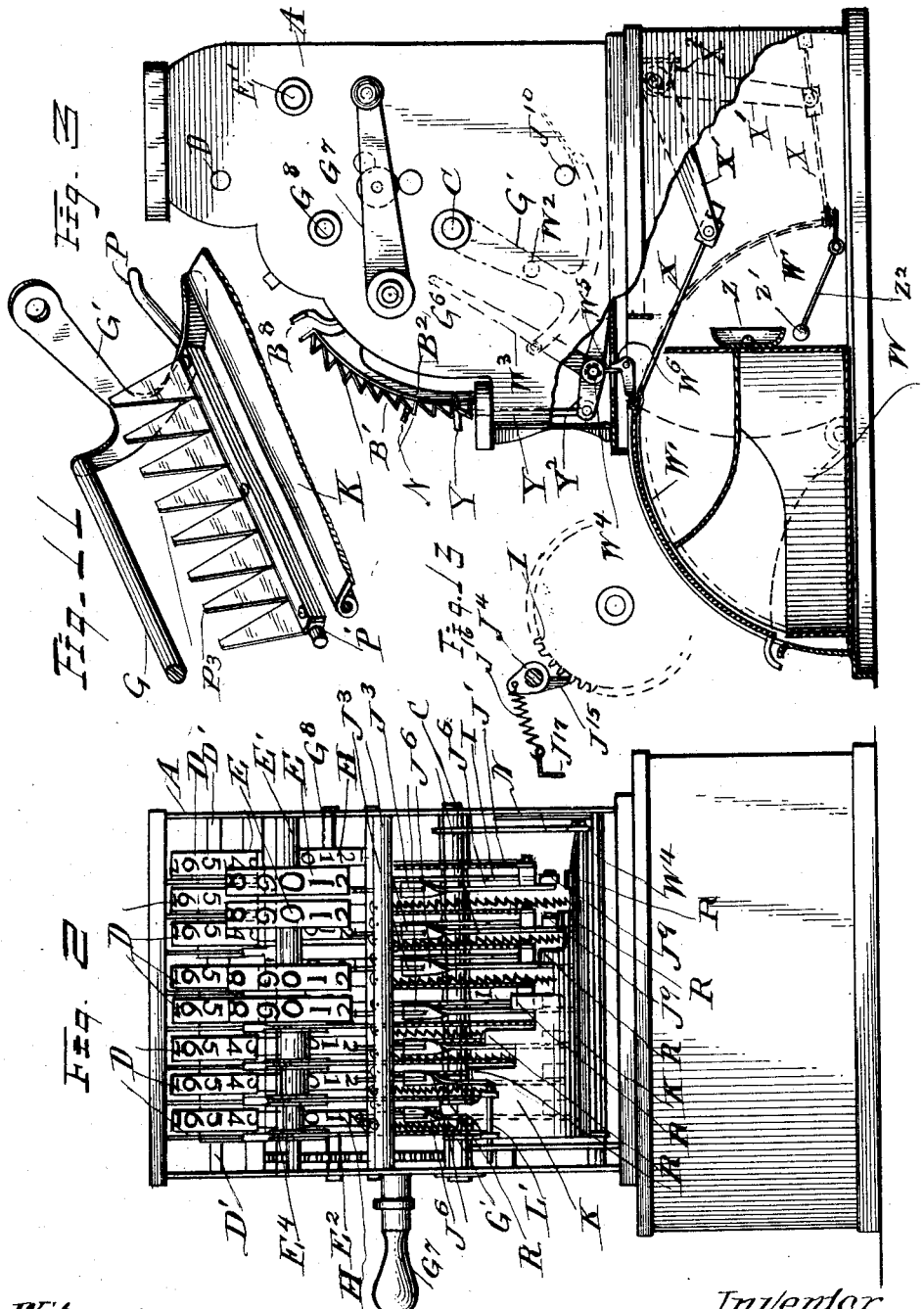

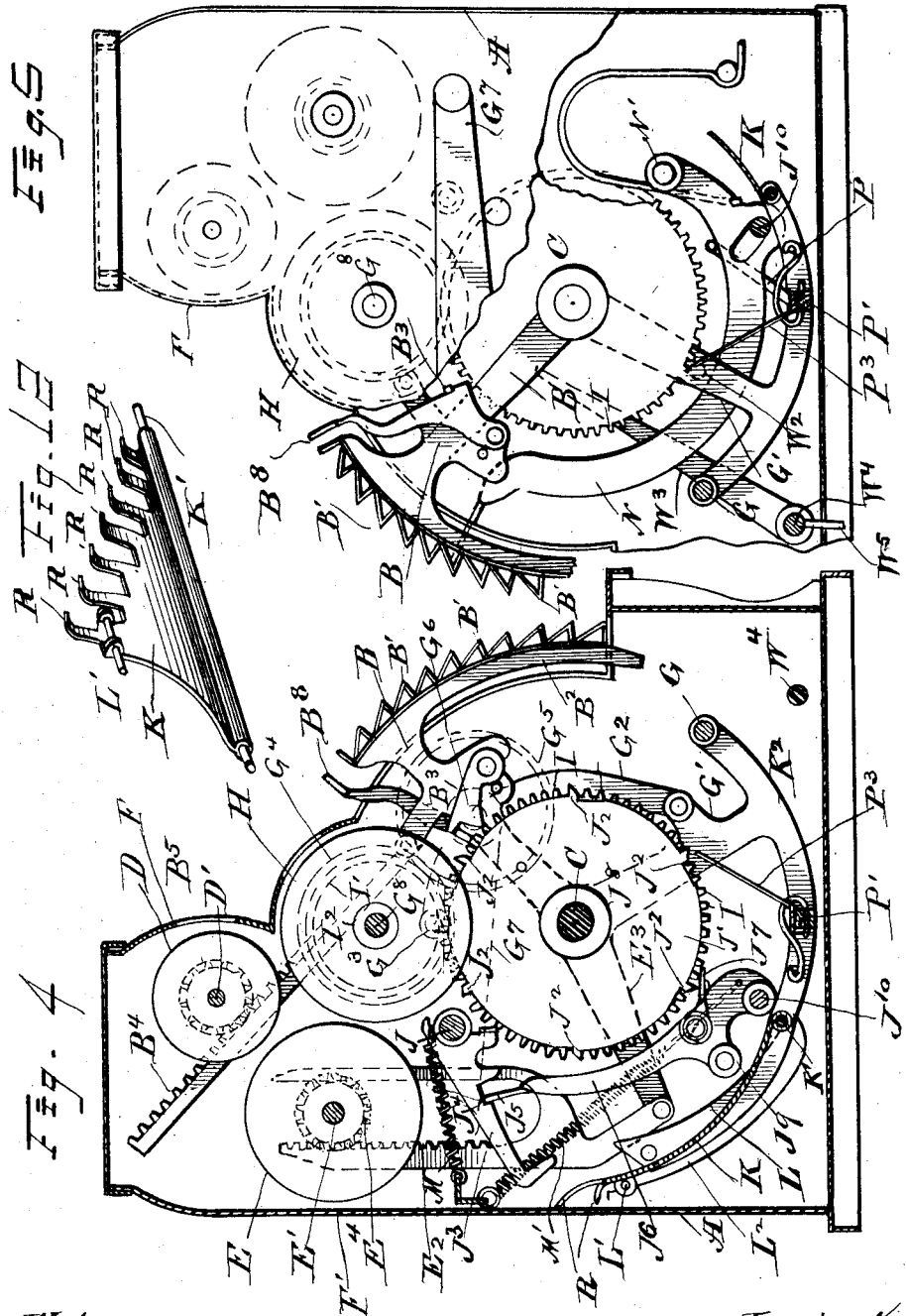

A. E. JACOBS.
CASH REGISTER.
APPLICATION FILED JUNE 30, 1914.
1,190,416.
Patented July 11, 1916.
4 SHEETS—SHEET 4.
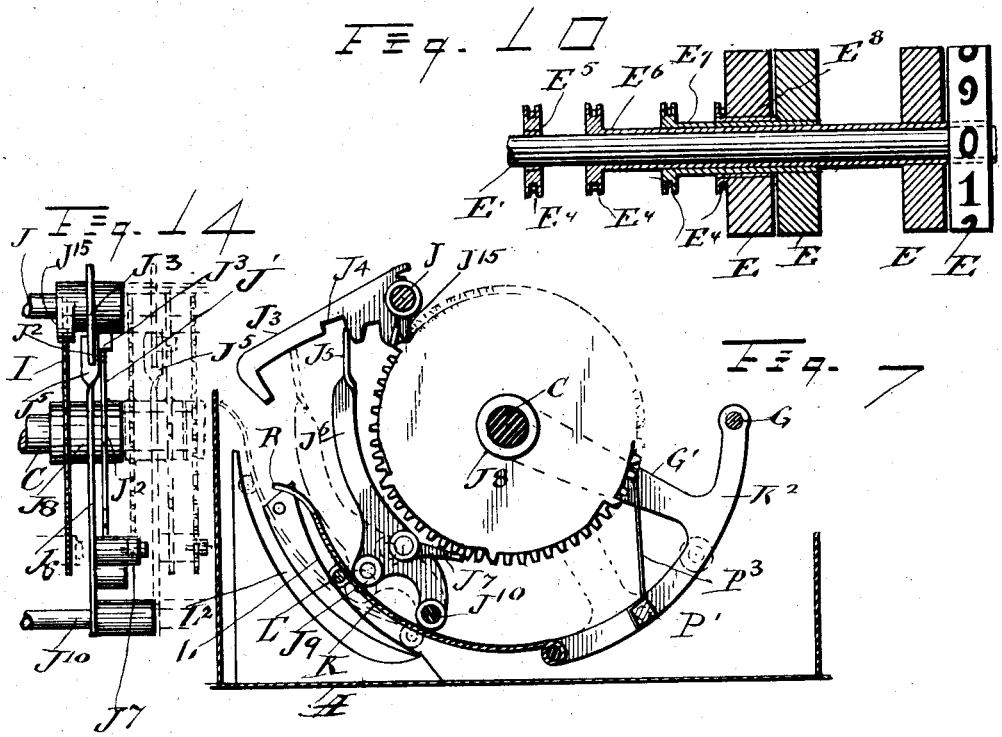
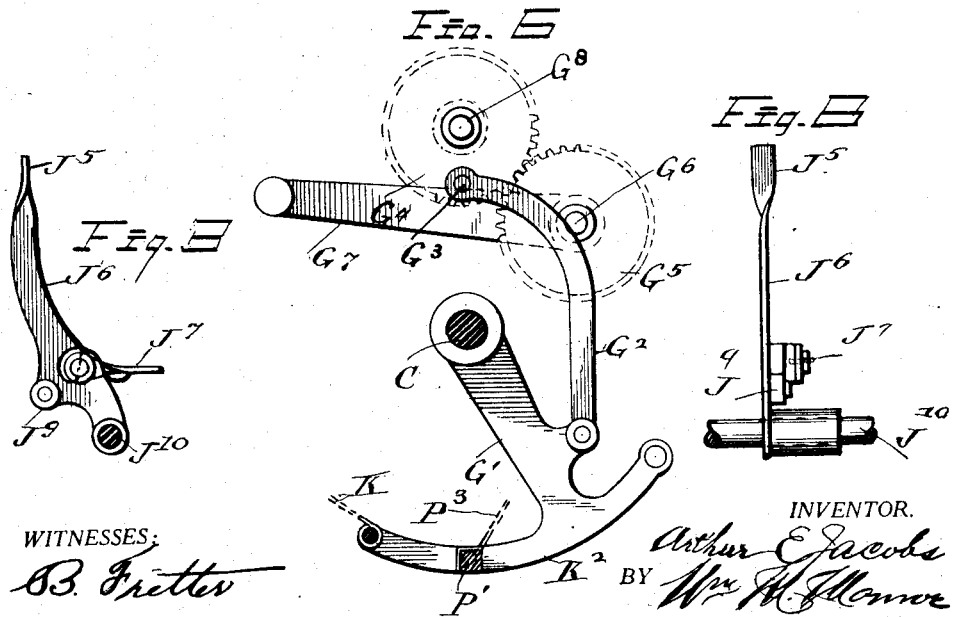
WITNESSES:
INVENTOR.
Arthur E. Jacobs
BY
ATTORNEY

UNITED STATES PATENT OFFICE.

ARTHUR E. JACOBS, OF CLEVELAND, OHIO.

CASH-REGISTER.

1,190,416.     Specification of Letters Patent.     Patented July 11, 1916.

Application filed June 30, 1914. Serial No. 848,116.

*To all whom it may concern:*

Be it known that I, ARTHUR E. JACOBS, a citizen of the United States, and resident of Cleveland, in the county of Cuyahoga and State of Ohio, have invented certain new and useful Improvements in Cash-Registers, of which I hereby declare the following to be a full, clear, and exact description, such as will enable others skilled in the art to which it appertains to make and use the same.

The objects of the invention are to provide a cash register for ordinary mercantile business, combined with an adding attachment, whereby the amount of each additional sale is added to the present sum, and the result exposed upon separate dials where it can be utilized by the operator, but does not show to the purchaser. When each sale is made a cash drawer is opened and the amount of the first sale is shown upon dials and can be separately seen by both dealer and customer, all subsequent sales or additions to the first sale are added to the amount visible to the dealer only, and any single sale up to the amount of $99.99 is shown upon dials visible to the customer. The dials shown to the dealer can be covered from sight if desired and the total sums received for any one period up to $999,999.99 can be observed only by the dealer if so desired. Thus, the dials which disclose the totals of added sales can be referred to by the dealer to show the amount of business done during the day.

The invention includes three sets of dials, viz. two sets of counting dials or sales dials, each dial numbered 0 to 9 respectively, and a third set, viz. dials for adding, each dial numbered 0 to 9, repeated three times. One set of sales dials shows each individual sale to the dealer, and is positioned in front of the machine, another set of sales dials shows the same sale to the customer and is positioned at the back of the machine, and the third set of dials or adding dials, shows the total amounts of all sales made, and are designed to show them to the dealer only at the front of the machine. The dials which disclose the separate sales are separately operated by the movements of finger operated levers, accessible to the dealer in front of the machine. The dials which disclose the amounts total of the sales are operated by a separate exterior lever at the time of returning the finger operated levers to the starting point. Mechanism is also employed, operated by said exterior lever, for returning all the finger operated levers to their places, which action also returns the sales dials to their first or 0 positions. This return movement also as stated serves to operate the adding dials to disclose the totals of sales made and previously indicated on the sales dials.

An important feature of the invention is found in the "tripping devices" whereby one digit is carried up upon each higher wheel in turn of the series of adding dials, thus increasing the total amount by adding a digit in the next position above.

The invention further comprises the means for releasing the cash drawer simultaneously with the action of said exterior lever, and means for returning the adding dials to the 0 position.

The invention further consists in the combination and arrangement of the several operating parts and construction of the various details, hereinafter described, shown in the accompanying drawings and specifically pointed out in the claims.

In the accompanying drawings Figure 1 is a perspective view of the complete device; Fig. 2 is a rear elevation thereof with the back removed; Fig. 3 is a side elevation thereof; Fig. 4 is a transverse section on line $a$—$a$ Fig. 2; Fig. 5 is a transverse section on line $b$—$b$ Fig. 2; Fig. 6 is a detail elevation of crank and pitman which operate the main and auxiliary ratchet wheels that actuate the adding dials; Fig. 7 is a side elevation of holding dog and main ratchet wheel; Fig. 8 is a front elevation; and Fig. 9 is a side elevation of one of the pivoted pawl holding members by means of which the tripping is accomplished to advance each adding dial in turn so as to show a higher digit thereon; Fig. 10 is a longitudinal section of the rear counting dials showing a common shaft and a sleeve for each dial; Fig. 11 is a perspective view of the spring pawls and their rocking support; Fig. 12 is a perspective view of the cam plate which operates the adding dogs; Fig. 13 is a side elevation of one of the retaining dogs for the main ratchets. Fig. 14 is a rear elevation showing one set of tripping and advancing mechanism for the adding dials.

In these views A is a casing in which the working parts are inclosed.

B, B, B, are finger operated levers which project through slots in the casing and are pivoted upon a main shaft C which passes transversely through the casing. Each finger lever is provided with a vertical column of digits from 0 to 9 respectively, the 0 being at the lower end and the 9 at the upper end in each lever. These digits are preferably spaced upon stepped edges $B'$ $B'$ which are secured to arcs $B^2$ mounted upon the levers B. As the finger levers move downward, spring pressed racks $B^4$, $B^4$, pivoted thereto operate gears $B^5$. $B^5$ operatively connected with the counting dials D, D, which constitute the sales dials, and are mounted loosely upon a shaft $D'$, and are each numbered from 0 to 9 to correspond with the digits upon the finger levers. The dials D, D, are at the front of the machine. These dials are 8 in number and will show a total sum of $999,999.99 and are for the benefit of the dealer only. When the finger levers are raised these dials return to 0. Similar dials E, E, are pivoted upon a shaft $E'$ at the rear of the machine, where they can be observed by the purchasers. These dials do not need to be more than four in number unless so desired. They are similarly operated by means of racks $E^2$, $E^2$, pivoted upon extensions $E^3$, $E^3$, of the finger levers, and by gears $E^4$, $E^4$, upon the respective sleeves $E^5$, $E^6$, $E^7$ and $E^8$. The racks $B^4$ and $E^2$ serve to rotate the two sets of sales dials when the finger levers are depressed to show the required digits in openings F, $F'$ provided in the front and rear walls respectively of the casing, and when the finger levers are raised the counting wheels constituting both the sets of sales dials are restored to 0. The finger levers are restored to position by means of a transverse bar G mounted upon arms $G'$, $G'$, which swing feebly upon the main shaft C, and which when raised engage all of the finger levers B, B, in turn and raise them to starting position. This bar is operated by means of a connecting rod $G^2$, a crank pin $G^3$, and a gear $G^4$, loosely mounted upon a shaft $G^5$ which in turn is engaged by the gear $G^5$ secured upon a short shaft $G^6$ to which is attached the hand operated lever $G^7$ which is positioned exterior to the casing, where it is readily accessible to the operator.

H, H, are a series of adding dial wheels loosely mounted upon a shaft $G^8$ and operated simultaneously with the return movement of the respective finger levers by means of the following mechanism: The dials are read through openings $H'$, $H'$ in the casing A. Each finger lever B is provided with a spring pressed pawl $B^3$ which engages the teeth of a main ratchet wheel I provided with 60 teeth, and moves when actuated by its corresponding finger lever through a number of teeth corresponding with the number of digits through which the finger lever moves. Each ratchet wheel I serves as a spur gear to engage and operate a second gear $I'$, which is attached to and in turn rotates one of the adding dials. Each adding dial contains three series of digits (each numbered from 0 to 9 respectively) and does not rotate backward but moves constantly in the same direction, so that when the digit 9 in one series of digits is passed the 0 of the next succeeding series appears. These adding dials and main ratchet wheels are manually operated by means of the upward movement of the finger levers, which is obtained by moving the exterior lever forward, and all but the first dial are automatically operated, each by the movement of the next preceding ratchet wheel I to advance one digit in the scale of numbers, thus adding 10, 100, 1000, etc., in turn to the total sum obtained at the time that the exterior lever is moved back to its starting point. This result is accomplished by special tripping and advancing mechanism constructed to operate as follows: A tripping ratchet wheel $J'$ is secured to and turns with each main ratchet wheel I, and they are connected by means of a sleeve $J^8$ loosely mounted upon the shaft C. The tripping ratchet wheel is provided with six teeth $J^2$, $J^2$, which are arranged to engage at every tenth space (equivalent to the series of digits upon the adding and sales dials) with a tripping pawl $J^3$ pivoted upon a shaft J, and to elevate the same to release a spring pressed pivoted arm $J^6$. This pawl $J^3$ is provided with a shoulder $J^4$ which engages the extremity $J^5$ of the pivoted arm $J^6$ upon a shaft $J^{10}$. A spring operated pawl $J^7$ pivoted on this arm engages with the main ratchet wheel I which operates the next succeeding adding wheel. It is understood that each set of main and tripping ratchet wheels is connected together in a pair and that one pair will operate the next succeeding pair of ratchet wheels, and thereby the corresponding gear and adding dial. Each adding dial H and its respective gear $I'$ are secured upon a common sleeve $I^2$ and gears and dials operate in pairs together. When held by the tripping pawl in the position shown in Fig. 4 the spring pawl $J^7$ is not operating the teeth of the main ratchet wheel. But when the tripping dog is raised to drop the arm $J^6$ a roller $J^9$ comes into engagement with a cam plate K pivoted at $K'$ upon a segment $K^2$ secured to the arm $G'$. This cam plate is so arranged as to fall entirely out of engagement with the roller $J^9$ on the forward movement of the exterior lever, but is raised upon the rearward or return movement of the exterior lever, and hence is then in position to engage the roller $J^9$ when the arm $J^6$ falls and move the spring pawl $J^7$ into engagement with the main ratchet wheel and move the ratchet wheel the distance of one tooth as the cam plate moves backward, which advances the corresponding dial and space of one digit. The means for raising and lowering the cam plate comprises a pivoted latch L over which a pin L' on the cam plate rides when the exterior lever moves backward, but the pin falls so as to ride in a slot L² underneath the latch upon the forward movement of the exterior lever. Upon the next backward movement of the exterior lever the cam plate will therefore raise and move the arm J⁶, and the pawl J⁷ so as to advance the main ratchet wheel it engages one tooth. The finger levers are returned to starting point by the forward movement of the exterior lever and this rotates the adding dials. The advancement of the adding dials for the purpose of addition is obtained by the return or rearward movement of the exterior lever. These movements are made to alternate in this manner so that the adding dials will remain quiet before the tripping and advancing movements begin.

A device is employed for throwing the adding dials back to 0, which is accomplished by means of a finger operated lever N pivoted at N' upon one end wall of the casing. This lever is arc shaped, having its radius taken from the center of the main shaft C, and its pivotal point N' is positioned near the rear of the casing. When this lever is depressed it releases an arm P attached to a spring pressed bar P' pivoted to the arcs K², K² at each end of the machine. The spring P² normally holds the arm in engagement with the arc shaped lever N and keeps a series of spring pawls P³, P³ which are attached to this arm, out of engagement with the several tripping ratchet wheels J' J', but when the lever N is depressed the arm P will fall and throw the spring pawls P³ into engagement with their respective tripping ratchet wheels J', J'. The first pawl P³ is advanced to throw its ratchet wheel first to the 0 position. The others throw their respective ratchet wheels and dials to the position of the digit 9. Then when the adding pawls J⁷, J⁷ are all operated they will return the ratchet wheels to the 0 position one at a time, as fast as the cam plate K raises the pawls J⁷ J⁷ into engagement with their ratchet gears. The cam plate is provided with a stepped edge at R, R, so as to act successively upon the rollers, pivoted arms and spring pawls J⁷, J⁷.

A dog J¹⁵ for each main ratchet wheel I prevents backward movement thereof, as shown in Figs. 13 and 14.

A cash drawer W beneath the register is provided with a locked cover W' which is opened when the lever G⁷ is revolved to raise the finger operated levers. This is accomplished by means of a pin W² upon one of the arms G', which moves an arm W³ and rotates a shaft W⁴ to which a finger W⁵ is attached. This finger engages and releases a latch W⁶ which retains the cover W' in position. A link and arm X', X' operated by a spring X² open the cover when it is released. See Fig. 3. A depressible rod Y in the front of the machine engages an arm Y' on the shaft W⁴ and serves to release the cover manually at any time desired.

A bell Z is struck by a clapper Z' mounted upon a pivoted wire Z² which is operated by the door when the door is withdrawn into the casing.

When an error has been made a little lever B⁸, pivoted upon each finger operated lever, is turned to release the pawl B³, so that the lever can be returned to the starting point without operating the gear and without changing the amount indicated on the total dials.

One of the great advantages of this device is found in the possibility of separate use of the parts. For instance the adding mechanism can be detached from the cash drawer and used as an adding machine independently of other uses, and the results will be visible upon the dials.

Having described the invention what I claim as new and desire to secure by Letters Patent is:

1. In a register, in combination, a series of pivoted finger operated levers, a casing in which they are mounted, a series of separately rotatable sales dials mounted in said casing, and a series of adding dials separately rotatable in said casing, said levers and sales dials provided each with a series of digits and said adding dials provided with a multiple number of the same series of digits, each of said sales dials operatively connected with one of said levers, to rotate the said dials when said levers are depressed, said adding dials operatively connected with said levers to rotate the said adding dials when said levers are raised to their former positions, and a separate device for restoring said levers and sales dials to their original positions.

2. In a register, in combination, a casing, a series of finger operated levers pivoted therein, a common pivot shaft therefor, each lever provided with a projecting segmental extremity having a series of digits thereon arranged in columnar order, a corresponding series of sales dials pivoted in said casing, each dial provided with a corresponding series of digits, a series of adding dials pivoted in said casing, each dial having corresponding series of digits thereon, said sales dials and adding dials operated by the movements of said levers to alternately advance said dials one digit at a time, and separate means for advancing said adding dials in turn the space of one digit when the preceding dial has passed the last digit of one of said series of digits.

3. In a register, a casing having reading openings, a series of number dials, and a series of adding dials rotatable within said casing, a series of finger operated levers pivoted in said casing and having projecting extremities upon which a series of digits are shown in columnar form, said number dials having a corresponding series of digits thereon, and said adding dials having corresponding series of digits thereon, means for rotating said number dials when said finger levers are depressed to show digits in said openings, corresponding to those on said levers, means for rotating said adding dials to show corresponding digits in said openings when the finger levers are raised, an arm pivoted exterior to said casing, a gear secured upon the pivot shaft of said arm, a second gear operated by said first mentioned gear, arms pivoted in said casing, a bar connecting said arms, and adapted to raise said finger operated levers to their starting positions, and a connecting rod pivotally connected at its ends with said second mentioned gear and with one of said pivoted arms.

4. In a register, the combination with a casing having reading openings, of a series of finger operated levers, projecting through said casing and provided each with a series of digits at its outer end, a common main shaft upon which said levers are pivoted, series of counting dials loosely pivoted within said casing, and supplied with corresponding series of digits, a gear attached to each counting dial, a rack mounted upon each finger operated lever and adapted to operate its respective gear and dial, when its respective lever is depressed, a series of adding dials loosely mounted upon a common shaft in said casing, a gear attached to each adding dial, a driving gear engaging with each gear on said adding dials, each driving gear mounted loosely upon said main shaft, and a spring pawl pivoted upon each finger operated lever engaging one of said driving gears, whereby said adding wheels are rotated upon the reverse movement of said finger operated levers.

5. In a register, in combination, a casing having reading openings, a series of adding dials provided each with series of digits readable in turn in said openings, a gear attached to each dial, a common shaft upon which said dials are loosely mounted, a main shaft, a series of driving gears loosely mounted thereon, and respectively engaging the gears upon said dials, a series of finger operated levers projecting through said casing and rotatable therein, and loosely mounted upon said main shaft, a spring pawl upon each of said levers adapted to engage and operate respectively said driving gears when said finger levers are elevated, an exterior lever pivotally mounted in the wall of the casing, a gear rotatable therewith, a driven gear operated thereby, a bar adapted to engage and raise all said finger operated levers, and a connecting rod operatively connected with said driven gear, and with said bar, whereby when said exterior lever is moved to one position all said finger operated levers will be raised and the respective adding dials will be rotated, and when the movement of the exterior lever is reversed, all the finger operated levers will be released for subsequent movement thereof.

6. In combination with a series of adding dials, each dial provided with a multiple number of series of digits, a common shaft on which they are loosely mounted, a gear attached to each dial, a series of corresponding driving gears, a shaft upon which said driving gears are loosely mounted, and a tripping wheel attached to each driving gear, and moving in unison therewith, and having one tooth for each series of digits on said adding dials, a series of depressible finger operated, pivoted, levers, each lever having a series of digits thereon, a pawl upon each lever adapted to engage and rotate one of said driving gears when its respective lever is being returned to starting position, a rotatable device for returning said finger operated levers, a second series of pawls engaging all but the first of said driving gears, and operated by the movement of said lever returning device, each of said second series of pawls being normally held out of engagement with its respective driving gear, and released by its respective tripping wheel, to permit of its operation upon the next following driving gear.

7. In combination, a series of adding dials provided each with a multiple number of series of digits, a gear attached to each dial, a driving gear for each of said gears, said driving gear having as many teeth as twice the number of digits in each series of digits in each dial, a tripping wheel attached to each driving gear, said tripping wheel provided with one tooth for each ten teeth in the driving gear, a series of depressible finger operated levers, adapted to engage and rotate the driving gears when said levers are raised, a bar for raising said levers, means for operating said bar, an adding pawl for operating each driving gear except the first, and normally out of engagement with its gear, a retaining device for each of said adding pawls, each retaining device adapted to be released in turn by one of the teeth in said tripping wheel, after one series has been completed on each dial in turn, so as to permit engagement of said adding pawl with its respective driving gear, and a member operated conjointly with said bar and adapted to move said adding pawls when released in turn into engagement with their respective driving gears.

8. In combination, in an adding device, a series of rotatable adding dials, each provided with a repeated series of digits thereon, an operating gear for each dial, a driving gear for each of said gears, a series of finger operated levers provided each with a series of digits corresponding with each series upon said dials, a pawl upon each finger operated lever adapted to engage and move one of said driving gears to operate its respective dial, when said lever is raised, an adding pawl adapted to engage each driving gear but normally out of engagement therewith, a tripping device for releasing said pawl, a device attached to each driving gear for operating each tripping device, after the full number of digits are passed in one series of its corresponding dial, each tripping device positioned to release the adding pawl that is adapted to engage the next following driving gear in its order, a device for raising said finger operated levers, and a member upon said finger raising device adapted to operate said adding pawls in turn when released by said tripping device, so that said adding pawls will engage and rotate said driving gears in turn to advance the respective dials the space of one digit.

9. In combination, in an adding device, a series of rotatable adding dials, each provided with a repeated series of digits thereon, an operating gear for each dial, a driving gear for each of said gears, a series of finger operated levers provided each with a series of digits corresponding with each series upon said dials, a pawl upon each finger operated lever adapted to engage and move one of said driving gears to operate its respective dial when said lever is raised, an adding pawl adapted to engage each driving gear but normally out of engagement therewith, a tripping device for said pawl, a device attached to each driving gear for operating each tripping device, after the full number of digits are passed in one series of its corresponding dial, each tripping device positioned to release the adding pawl adapted to engage the next following driving gear in its order, a device for raising said finger operated levers, and a member thereon adapted to operate said adding pawls in turn when released by said tripping devices, so that said adding pawls will engage and rotate said driving gears in turn to advance the respective dials the space of one digit, and means for returning all said adding dials to the 0 position.

10. In driving, tripping and advancing devices for a set of adding dials, driving and driven gears for each dial, a toothed tripping wheel for each driving gear, levers for operating the driving gears in one direction, an adding pawl for each driving gear, normally held out of engagement therewith, a holding pawl for each adding pawl, the teeth on each of said tripping wheels adapted to engage and trip said holding pawls in turn to permit said adding pawls to engage their respective driving gears, a device for engaging each of said levers to operate said driving gears, a member hinged to said lever engaging device, and adapted to engage said adding pawls in turn, when released, and force them into engagement with their respective driving gears when the levers are not in motion, and means adapted to lift said member to engage said pawls, when said member is moving in one direction, but permitting it to move out of engagement therewith when on its return movement.

11. The combination in a register, of a casing, counting dials therein, operating levers therefor, a lever adapted to restore said dial operating levers to their starting points, a cash drawer in said casing, spring actuated revoluble cover therefor, a locking latch for said cover, and means whereby the operation of said restoring lever will release said latch to permit the automatic movement of said cover.

In testimony whereof, I hereunto set my hand this 10" day of June 1914.

ARTHUR E. JACOBS.

In presence of—
WM. J. KLOTZBACH,
WM. M. MONROE.

Copies of this patent may be obtained for five cents each, by addressing the "Commissioner of Patents, Washington, D. C."